United States Patent
Graham

(10) Patent No.: US 6,205,469 B1
(45) Date of Patent: Mar. 20, 2001

(54) METHOD FOR CLIENT-SERVER COMMUNICATIONS THROUGH A MINIMAL INTERFACE

(75) Inventor: Paul Graham, Cambridge, MA (US)

(73) Assignee: Yahoo! Inc., Santa Clara, CA (US)

( * ) Notice: Subject to any disclaimer, the term of this patent is extended or adjusted under 35 U.S.C. 154(b) by 0 days.

(21) Appl. No.: 08/863,874

(22) Filed: May 27, 1997

(51) Int. Cl.$^7$ ................................................ G06F 15/82
(52) U.S. Cl. ............................................ 709/203; 709/311
(58) Field of Search ..................... 395/200.33, 200.48, 395/200.49, 684, 200.57; 709/1, 100, 106, 310, 311, 202, 203

(56) References Cited

U.S. PATENT DOCUMENTS

| | | | |
|---|---|---|---|
| 5,426,421 | * | 6/1995 | Gray ........................................ 709/223 |
| 5,710,918 | * | 1/1998 | Lagarde et al. ......................... 707/10 |
| 5,734,831 | * | 3/1998 | Sanders .................................. 709/223 |
| 5,737,533 | * | 4/1998 | de Hond ............................. 395/200.49 |
| 5,761,673 | * | 6/1998 | Bookman et al. ..................... 707/104 |
| 5,774,670 | * | 6/1998 | Montulli .......................... 395/200.48 |
| 5,793,966 | * | 8/1998 | Amstein ........................... 395/200.33 |
| 5,828,840 | * | 10/1998 | Cowan et al. ....................... 709/203 |

OTHER PUBLICATIONS

Paul Graham, "The State of a Program and Its Uses," Harvard, University, 1990, printed in 1999.

* cited by examiner

*Primary Examiner*—Dung C. Dinh
(74) *Attorney, Agent, or Firm*—Philip H. Albert; Townsend and Townsend and Crew LLP

(57) ABSTRACT

The concept of a subroutine call is one of the basic ideas in computer science. The invention relates to a technique for achieving the effect of subroutine calls in certain situations where they would not otherwise be possible. The invention allows for the simulation of subroutine calls in applications where the interaction with a client is reduced to successive iterations in which the application sends the client a set of keys, and the client chooses one of the keys and sends it back to the application (i.e., a minimal interface). In one implementation, the invention is used to simulate subroutine calls in an application running on a Web server and communicating with the client through successive Web pages.

10 Claims, 2 Drawing Sheets

METHOD FOR CLIENT-SERVER COMMUNICATIONS THROUGH A MINIMAL INTERFACE

FIELD OF THE INVENTION

In general the invention relates to a method for simulating subroutine calls in applications that communicate with a client (i.e., a user) through a minimal interface. In particular, the invention relates to the use of continuations to simulate subroutine calls in a program that interacts with the user through successive Web pages.

BACKGROUND OF THE INVENTION

The invention involves a new use of an existing technology called continuations. Suppose there are two functions f and g, where f takes an argument x and returns g(x)+1, and g returns twice its argument. So, calling f(n) returns 2n+1. The two functions could be expressed in Scheme as follows:

(define (fx)
(+(gx)1))
(define (gx)
(*x2))

Scheme is an IEEE standard language often used to describe algorithms. Scheme is used here, instead of the more conventional Pascal-like pseudocode, because it has some additional needed abstractions. Scheme is a prefix language, so x+1 is expressed as (+x1). In more conventional pseudocode, f and g might be expressed as:

Function f(x)
return g(x)+1
Function g(x)
return x*2.

The function g is a subroutine. The value g returns gets sent back to a calculation in process in f. After g sends control back to f, one is added to the value g returned, and then that value is returned by f.

It is possible to transform any pair of functions like f and g so that nothing has to happen in f after g returns. This can be done by packing into another function, c, everything that is supposed to happen in f after g returns, and passing c as an additional argument to g. The additional argument, c, is called a continuation. The function g is then rewritten so that instead of returning the value it would have returned, it returns the result of passing it to the continuation. For example, the original f and g could be rewritten as:

(define (f2x)
(g2x(lambda (y) (+y1))))
(define (g2xc)
(c(*x2))).

It is noted that, in Scheme, "(lambda (x) (+x1))" means a function that takes one argument and returns that plus one. The function f2 takes one argument, a number x. It calls g2 with two arguments: x, and a function that returns its argument plus one. The work that used to be done in f after control returned from g is now packed up in a function and sent as an additional argument to g2. The function g2 takes two arguments, a number x and a function c. It returns the result of calling c on x*2. In this case, c is a function that adds one to its argument, so g2 returns (and in turn f2 returns) 2x+1, just as f did in the previous example.

Any ordinary program can be transformed to use continuations, so that nothing ever happens in a calling function after control returns from a subroutine. The form of the program that results from this transformation is called "continuation-passing style." This technique can be applied to subroutine calls to any depth. For example, the functions:

(define (fx)
(+(gx)1))
(define (gx)
(*(hx)2))
(define (hx)
(-x3))

Can be transformed into:
(define (f2x)
(g2x(lambda (y) (+y1))))
(define (g2xc)
(h2x (lambda (y) (c(*y2)))))
(define (h2xc)
(c(-x3)))

Web pages are usually sent from one machine (e.g., a server) to another (e.g., a client). The two machines can be the same, but typically are separate machines that communicate via a network. The term "server" can mean both the physical machine that is sending web pages and the software on the machine that responds to requests for pages.

The client requests a web page from the server using a url (i.e., Universal Resource Locator). A url has three parts: the protocol by which the client wants to talk to the server, the name of the server, and a third part, referred to herein as the "request," that indicates what the client wants the server to send it. The following is an example of a url expressed in a form commonly used today: http://www.foo.com/bar.html. In this url, "bar.html" is the request. Most servers would interpret "bar.html" as a request for an html file stored on disk, and would respond by reading the file and sending it to the client. But how to respond to a request is entirely up to the server. A server could equally well choose to interpret "bar.html" as a request to generate a web page containing the current time.

A web page usually contains some amount of text plus html operators specifying how to display the page on the screen. The client software (e.g. a browser) has considerable leeway in deciding how to display the page to the user. The aspect of the display of web pages relevant to the subject application is the display of links and forms.

A link is usually a combination of text and/or an image, plus a url. Typical client software will display the text or image with an underline, an outline, or some other indication that the text is active. The user can indicate that he wants to follow that link usually by clicking on it with a mouse. The phrase "to click on a link" is used herein as a general term to mean whatever method the user uses to indicate that he wants to follow a link. When the user clicks on a link, the request in the associated url is sent to the web server mentioned in that url. Usually, the request will cause the server to send the client another web page, which will in turn contain other links, resulting in an ongoing series of requests from the client interweaved with web pages sent in reply by the server(s).

A form is like a link in that it includes places (e.g., "buttons") where the user can click to send a request to a server, but it can also include "fields", through which the user can send additional information along with the request. For example, a form field might be a menu of choices, a box in which the user can type text, or a button that the user can toggle on or off.

The term "link" is used herein to include both links and forms, along with any other element of a web page that has an associated url, and which a user can click on to send the request in the url to the server mentioned therein.

SUMMARY OF THE INVENTION

The present invention features a method for communicating between a client and a server through a limited communication interface. The communication interface may be the world wide web. The server may be a web server, and the client and server may reside in the same computer platform. As used herein, limited communication interface refers to an interface that, in general, comprises links and forms. More particularly, the interface processes successive iterations in which the server sends a set of keys to the client and the client chooses one of the keys and sends it back to server.

The method also includes providing continuation functions associated with each of a plurality of links. The continuation function may refer to another continuation function. Each of the plurality of links may represent a parameter in a web page. The plurality of links includes a key that is associated with one of the continuation functions.

The plurality of links are sent through the limited communication interface from the server to the client. A selected one of the plurality of links is sent from the client to the server. The continuation function associated with the selected link in the server is then executed. The continuation function may be executed at the server.

The present invention also features a method for communicating between a plurality of clients and a web server through a limited communication interface. The method includes providing continuation functions associated with each of a plurality of links. The plurality of links is sent through the limited communication interface from the server to the plurality of clients. A selected one of the plurality of links is sent from one of the plurality of clients to the server. The continuation function associated with the selected link in the server is executed.

DETAILED DESCRIPTION

Figure 1:
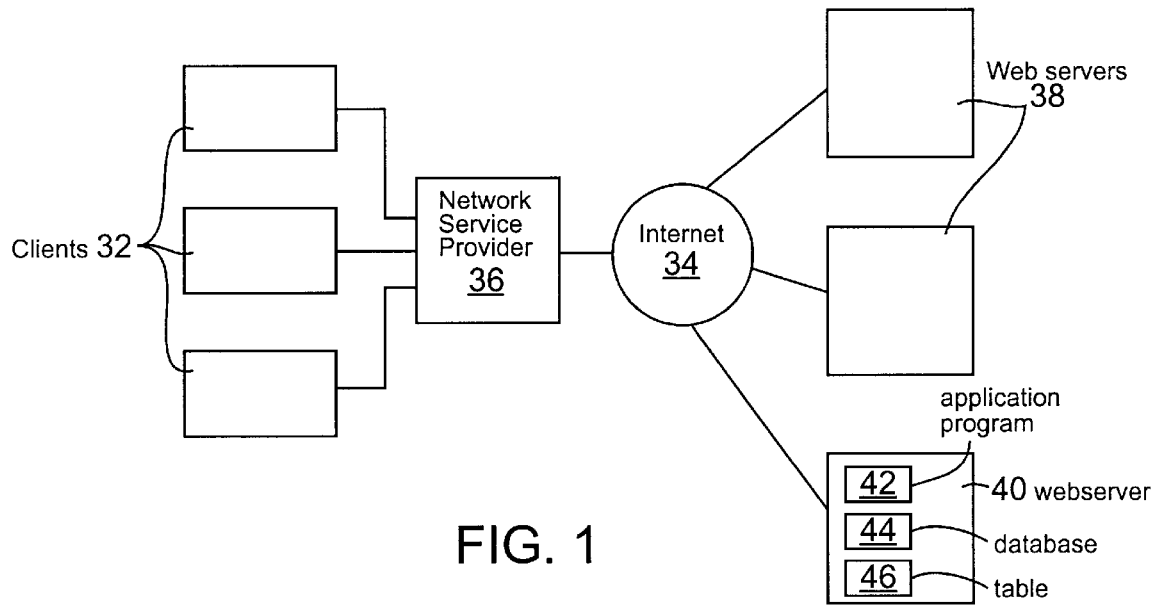
FIG. 1 is a block diagram of a client-server computing system incorporating the principles of the invention.
Figure 2:
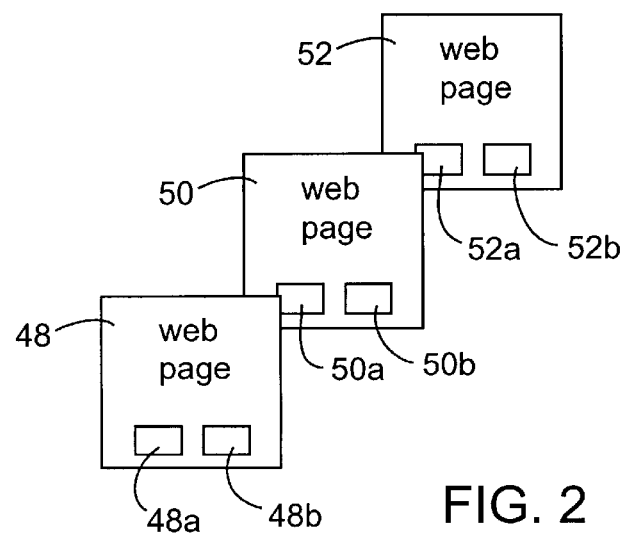
FIG. 2 is an illustration of successive Web pages containing links that a user can click on to send commands back to the server.

Referring to FIG. 1, a distributed computing environment 30 includes clients 32 (e.g., a computer, fax machine, web-enabled television) connected to the Internet 34 (or to an intranet) via a network service provider 36. A users can manipulate a client 32 via a user interface (not shown). Each client 32 can communicate with other clients or with web servers 38, 40 (e.g., game sites, video sites, corporate sites, libraries, electronic publishing) through the network service provider 36. The web server 40 includes an application program 42 and a database 44. The invention can reside in the web server 40 or in one or more clients 32.

The invention relates to a novel use for continuations to solve a problem that has become especially important with the rise in popularity of the World Wide Web. In particular, continuations are used to simulate subroutine calls in a program that interacts with the client 32 through successive Web pages. Where a regular piece of desktop software would display successive screens to the user, the invention relates to the display of successive Web pages 48, 50, 52. The pages contain links 48a, 48b, 50a, 50b, 52a, 52b that the user can click on to send commands back to the server 40.

Each time a Web page is generated for the client 32, the code that should be executed for each link that could be clicked on is also generated. Each piece of code is stored in a table 46 on the server 40 and indexed under a unique key. When the page is sent to the client 32, the request part of each link includes the key of the corresponding piece of code. When the user clicks on a link, a key is included in the request sent to the server 40, and the server 40 responds by executing the code stored in its table under that key. This code will usually end by sending another page to the client 32, containing its own links, each associated with more code on the server 40. In this way, the client 32 and the server 40 maintain an ongoing conversation of button clicks interleaved with Web pages sent in response.

It is often useful to have subroutine-like behavior in interactive client-server sessions. For example, suppose a user is running ordinary desktop software and, for some reason, wants to select a color. The program he is using will generally call a subroutine that pops up a window where he can select a color. After the user selects the color, the color-selection subroutine returns control, along with the selected color, back to the code that called it. This kind of behavior is easy to achieve in desktop software, where the operating system manages interactions with the user and has built-in support for subroutines.

The invention uses continuations to get the same effect in interactive client-server sessions consisting of ordinary Web pages. The key observation is that, when a program is written using continuations, nothing remains to be done after a subroutine returns. Therefore, it does not matter if the subroutine never returns to the calling code.

Figure 3:
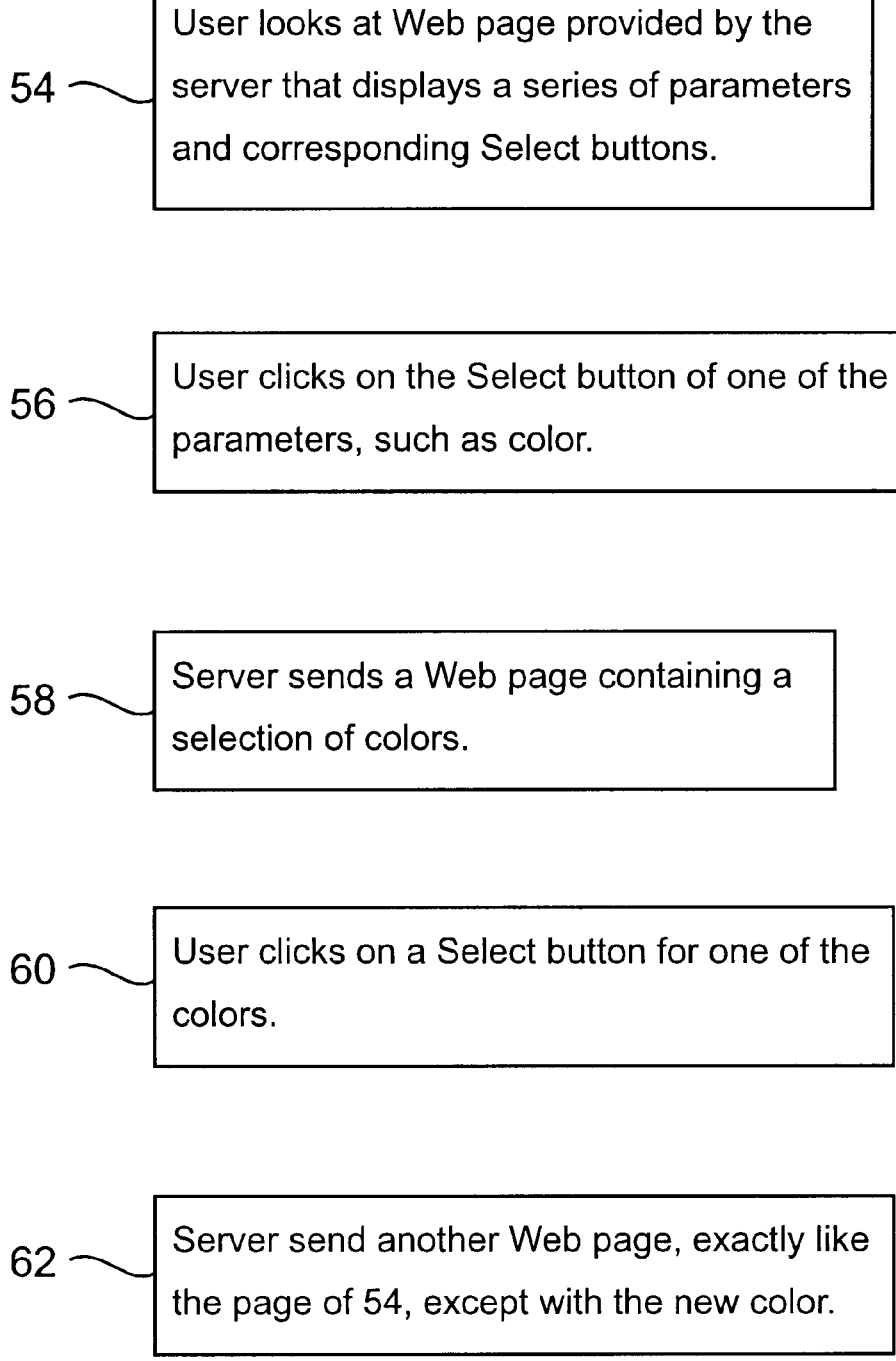
FIG. 3 is a flow chart illustrating the use of continuations to simulate subroutine calls in a program that interacts with the user through successive Web pages

When the code is generated for each link on the page that is sent to the client 32, each piece of code can have an associated continuation. When the user clicks on a link and a piece of code is run, it ends by calling the continuation. There is no actual notion of subroutines. The code does not return control to any calling code. However, because all that would have happened in the calling code is embodied in the continuation, it looks to the user just as if control returned from a subroutine. By way of example, consider the following client-server interaction (FIG. 3):

1. A user is looking at a page provided by the server displaying a series of parameters he might want to change (54). Suppose some of the parameters are colors, and are shown as swatches representing the current value of the parameter, plus a Select button that can be clicked on to select a new value.
2. The user clicks on the Select button of one of the parameters (56), and is then sent a Web page by the server containing a selection of colors that he can click on to choose a new value (58).
3. The user clicks on one of the colors (60), and is sent another page by the server (62), exactly like the one shown in Step 1, except with a new color for the parameter whose Select button he clicked on.

Step 2 looks to the user like a subroutine call. It looks to the user as if he were merely returning to the page shown in Step 1. But what actually happens inside the server is that the code associated with each of the links generated in Step 2 (i.e., the possible colors) has as its continuation another piece of code that will generate the same page that was generated in Step 1. Because continuations can refer to other continuations, it is possible to simulate nested subroutine calls as deep as necessary.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims. For example, although the primary use of the invention has been in server-based applications that use Web pages as their interface, it could equally well be applied in any situation where the interaction between application and client is similarly minimal.

What is claimed is:

1. A method for communicating between a client and a server through a limited communication interface, the method comprising:

provinding continuation functions associated with each of a plurality of links, wherein a continuation function includes a reference to a continuation argument representing a remaining sequence of instructions for subsequent execution;

sending the plurality of links through the limited communication interface from the server to the client;

sending a selected one of the plurality of links from the client to the server; and executing the continuation function associated with the selected link in the server including executing the remaining sequence of instructions.

2. The method of claim 1 wherein the server is a web sever.

3. The method of claim 1 wherein each of the plurality of links represents a parameter in a web page.

4. The method of claim 1 wherein each of the plurality of links includes a key that is associated with one of the continuation functions.

5. The method of claim 1 wherein the client and the server reside in the same computer platform.

6. The method of claim 1 wherein the continuation function refers to another continuation function.

7. The method claim 1 wherein the communication interface is the world wide web.

8. The method of claim 1 wherein the step of executing the continuation function associated with the selected link in the server is performed at the server.

9. The method of claim 1 further comprising the step of storing code containing each continuation function in a table that is associated with each link.

10. A method for communicating between a plurality of clients and a web server through a limited communication interface, the method comprising:

providing continuation functions associated with each of a plurality of links, wherein a continuation function includes a reference to a continuation argument representing a remaining sequence of instructions for subsequent execution;

sending the plurality of links through the limited communications interface from the server to the plurality of clients;

sending a selected one of the plurality of links from one of the plurality of clients to the server; and executing the continuation function associated with the selected link in the server including executing the remaining sequence of instructions.

\* \* \* \* \*